United States Patent
Watt et al.

[11] Patent Number: 5,501,420
[45] Date of Patent: Mar. 26, 1996

[54] COUNTERBALANCE MECHANISM

[75] Inventors: Richard L. Watt; Donald R. Pangborn; Peter J. Kerl, all of Jamestown, N.Y.

[73] Assignee: Weber-Knapp Company, Jamestown, N.Y.

[21] Appl. No.: 261,444

[22] Filed: Jun. 17, 1994

[51] Int. Cl.$^6$ ..................................... E04G 3/00
[52] U.S. Cl. ................. 248/280.11; 248/292.11; 248/919; 248/920; 248/923
[58] Field of Search ................... 248/917, 918, 248/919, 920, 921, 922, 923, 280.11, 292.1, 123; 312/196, 223.2; 108/2, 5, 7, 10, 9, 50, 145

[56] References Cited

U.S. PATENT DOCUMENTS

| | | | |
|---|---|---|---|
| 3,215,386 | 11/1965 | Swenson | 248/400 |
| 4,383,486 | 5/1983 | Reineman et al. | 108/2 |
| 4,703,700 | 11/1987 | Sema | 108/10 |
| 4,729,533 | 3/1988 | Hillary et al. | 248/184 |
| 4,834,329 | 5/1989 | Delapp | 248/183 |
| 5,180,136 | 1/1993 | Sova | 248/576 |

Primary Examiner—Leslie A. Braun
Assistant Examiner—Gwendolin Wrenn
Attorney, Agent, or Firm—Bean, Kauffman & Spencer

[57] ABSTRACT

A counterbalance mechanism for vertically positioning a load includes auxiliary linkage means associated with an upper end of the mechanism for carrying a load and automatically varying the vertical angular orientation of the load incident to vertical movement of the load.

17 Claims, 3 Drawing Sheets

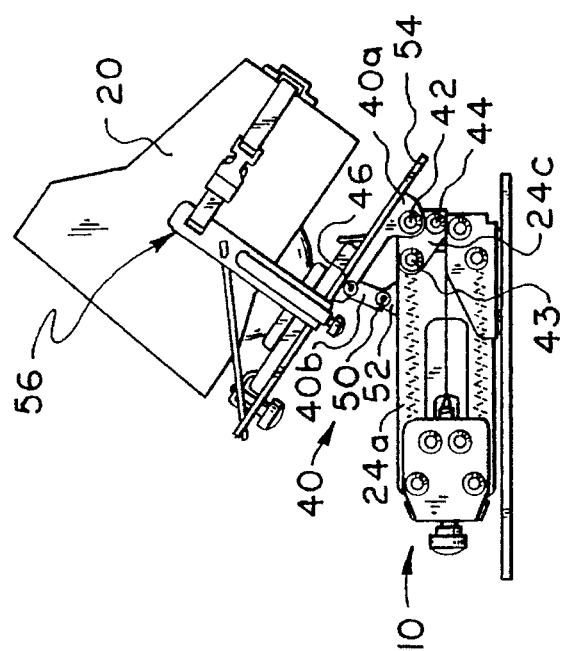
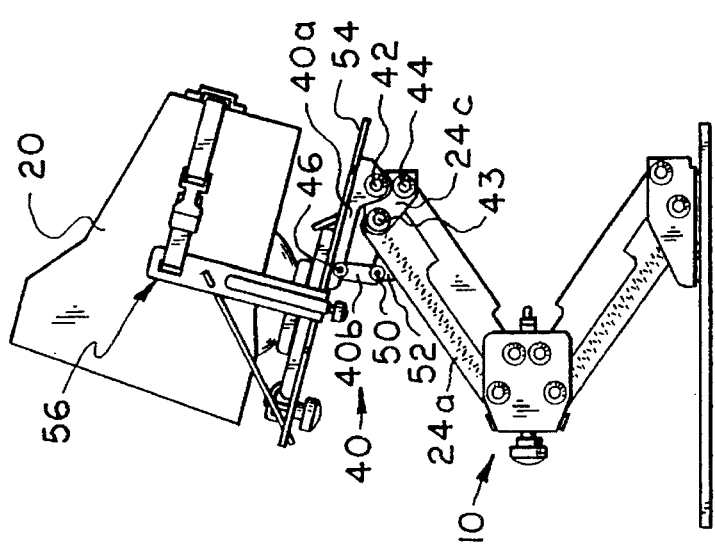
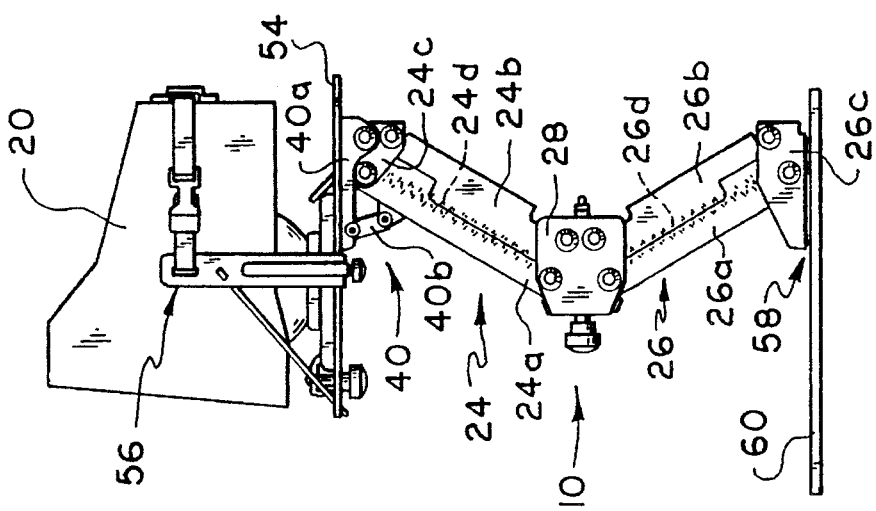

5,501,420

COUNTERBALANCE MECHANISM

BACKGROUND OF THE INVENTION

Counterbalance mechanisms having means for adjustably tilting a load support surface or platform carried adjacent an upper end of a parallelogram linkage are known. U.S. Pat. No. 3,215,386 to Swensen teaches a tiltable seat pivotally attached to an upper frame member which is vertically movable relative to a lower frame member via a parallelogram linkage having pneumatic counterbalance means connected thereto. U.S. Pat. No. 4,729,533 to Hillary et al. discloses a monitor support including a tiltable platform connected to the upper end of a single parallelogram linkage, while U.S. Pat. No. 4,834,329 to Delapp discloses a monitor support including a tiltable platform connected to the upper end of a double parallelogram linkage. In the above constructions, the tilt angle or angle of orientation remains constant during vertical movement of the platform, and must be adjusted independently of vertical position.

SUMMARY OF THE INVENTION

The present invention relates to counterbalance mechanisms for vertically positioning a load, and more particularly to a counterbalance mechanism having auxiliary linkage means for carrying a load and automatically tilting the load incident to vertical movement thereof.

In accordance with a preferred embodiment of the present invention, a counterbalance mechanism comprising upper and lower parallelogram linkages includes an auxiliary linkage operatively associated with a distal end of the upper linkage. The auxiliary linkage comprises a primary link and a secondary link pivotally connected at adjacent ends thereof. An opposite end of the primary link is pivotally connected to a distal end of the upper linkage, and an opposite end of the secondary link is pivotally connected to a side link of the upper linkage intermediate opposite ends of the side link. The primary link includes means to secure a load, such as a computer monitor, for movement therewith. As the monitor is moved vertically by a user, the primary link is automatically caused to tilt vertically, consequently varying the vertical angular orientation of the viewing screen of the monitor.

The counterbalance mechanism may additionally include trackway means connected to a distal end of the lower linkage for enabling horizontal positioning of the monitor.

BRIEF DESCRIPTION OF THE DRAWING

The nature and mode of operation of the present invention will now be more fully described in the following detailed description taken with the accompanying drawing figures wherein:

FIGS. 2a–2c are a series of side elevational views of a mechanism formed in accordance with the present invention respectively depicting an uppermost, an intermediate, and a lowermost vertical position thereof, to illustrate the variation in angular orientation of a monitor supported thereby as a function of vertical position.

DETAILED DESCRIPTION

Figure 1:
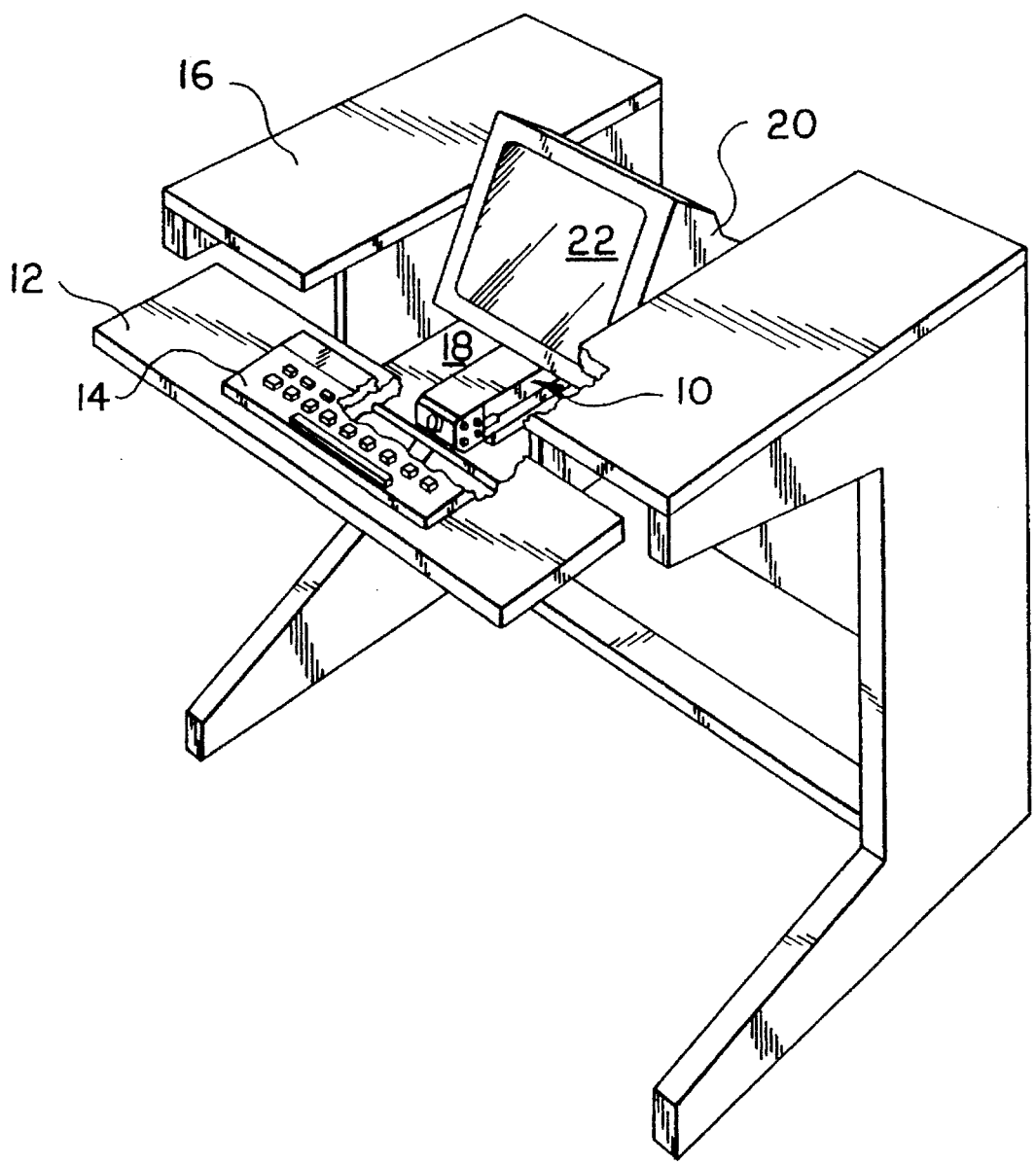
FIG. 1 is a perspective view showing an intended environment of the present invention.

Referring first to FIG. 1, a counterbalance mechanism formed in accordance with a preferred form of the present invention is shown in a preferred environment and designated generally as 10. The illustrated environment includes a computer workstation comprising a front shelf 12 for supporting a keyboard 14, and a rear desk or support 16 having a recessed support surface 18 for supporting mechanism 10 and receiving a load, such as a monitor 20, to be positioned by mechanism 10. Monitor 20 includes a viewing screen 22, whose vertical position, vertical angular orientation, and horizontal position it is desired to control.

Referring now to FIGS. 2a–2c, mechanism 10 is shown as including parallel link means comprising an upper parallelogram linkage 24 and a lower parallelogram linkage 26 interconnected at adjacent ends thereof by a common connecting link 28. Upper linkage 24 includes front and rear side links 24a and 24b, respectively, and a distal or upper end link 24c pivotally connected to the ends of side links 24a and 24b located remotely of connecting link 28. Similarly, lower linkage 26 includes front and rear side links 26a and 26b, respectively, and a distal or lower end link 26c pivotally connected to the ends of side links 26a and 26b located remotely of connecting link 28. Counterbalance means in the form of springs 24d and 26d are associated with upper and lower linkages 24 and 26, respectively. The parallel link means and associated counterbalance means are preferably of a type shown and described in commonly owned U.S. Pat. No. 5,180,136 to Sova, the disclosure of which is incorporated herein by reference.

In accordance with the present invention, an auxiliary linkage, generally designated as 40, is operatively associated with the distal end of upper linkage 24. As further shown in FIG. 3, auxiliary linkage 40 comprises a primary link 40a and a secondary link 40b. A first end of primary link 40a is pivotally connected to upper end link 24c by a pivot pin 42 disposed remotely of the point of pivotal connection of upper end link 24c to front side link 24a indicated by a pivot pin 43, however an alternative construction wherein the first end of primary link 40a is pivotally connected to upper end link 24c by a pivot pin 44 associated with rear side link 24b is contemplated. A first end of secondary link 40b is pivotally connected adjacent the second end of primary link 40a by a pivot pin 46 arranged to extend through a bracket 48 fixed to the underside of primary link 40a, with a second end of secondary link 40b being pivotally connected to front side link 24a at a point disposed remotely of pivot pin 43 and generally intermediate the ends of front side link 24a by a pivot pin 50 arranged to extend through a bracket 52 fixed to front side link 24a.

Primary link 40a is configured to permit it to support and carry a desired art device, such as a platform 54 adapted in turn to support monitor 20, whose vertical position and vertical angular orientation are desired to be adjusted for purposes of viewing comfort by a user. Platform 54 is preferably provided with suitable clamping means 56 for removably securing monitor 20 to the platform to prevent the monitor from tipping incident to tilting of the platform.

Figure 3:
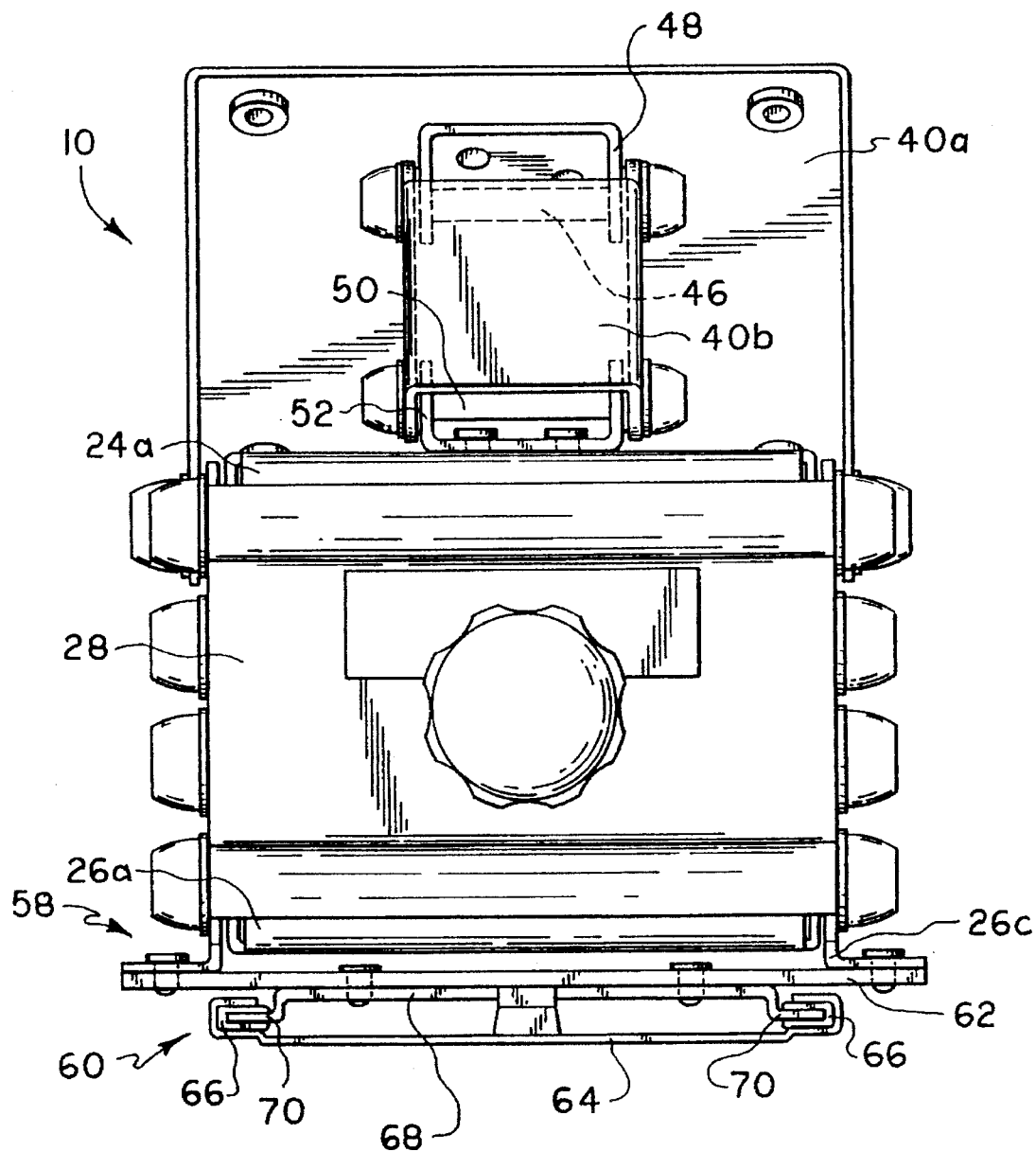
FIG. 3 is a front elevational view thereof in its lowermost vertical position.

As best shown in FIG. 3, the distal end of lower linkage 26 is operatively associated with a base 58 for attaching mechanism 10 to a desired support, such as support surface 18. Base 58 preferably includes trackway means 60 for permitting horizontally directed reciprocating movement of monitor 20, or other device supported by mechanism 10, relative to desk 16. In a preferred construction, a base plate 62 is fixed to lower end link 26c and trackway means 60 comprises an elongated track plate 64 having a pair of parallel opposing guide channels 66 extending along opposite sides of the track plate, and a guide plate 68 fixed to base plate 62 and having a pair of opposite side flanges 70 arranged to be received one within each of the guide channels for horizontal sliding movement therealong. Track plate 64 may be adapted for fixable mounting to support surface 18, shown in FIG. 1, or other desired support.

Referring once again to FIGS. 2a–2c, the mode of operation of the present invention will now be described. FIG. 2a depicts mechanism 10 in its uppermost vertical position, wherein primary link 40a and platform 54 are disposed at a vertical angular orientation, or angle from the horizon, of about zero degrees, such that the viewing screen 22 of monitor 20 is substantially perpendicular to an imaginary essentially horizontal line of sight (not shown) taken from a viewing reference position horizontally remote from the viewing screen, such as would be defined when a user is seated before keyboard 14.

As monitor 20 is lowered under downwardly directed force by a user to a selected intermediate vertical position, as illustrated in FIG. 2b, the line of sight drops to an angle below the horizon as the user's eyes follow screen 22. In accordance with the present invention, auxiliary linkage 40 cooperates to define a four-bar linkage having pivot points at pivot pins 50, 46, 42, and 43, whereby primary link 40a is automatically caused to pivot about an axis of rotation of pivot pin 42 when front side link 24a rotates about an axis of rotation of pivot pin 43 during operation of upper linkage 24 incident to vertically directed movement of monitor 20. Consequently, primary link 40a tilts continuously and reversibly as monitor 20 is lowered, such that the forward end of the primary link adjacent secondary link 40b becomes relatively higher than the rearward opposite end of the primary link, thereby adjusting the orientation of monitor 20 carried thereby to maintain viewing screen 22 in a substantially perpendicular relationship to the line of sight.

FIG. 2c depicts mechanism 10 in its lowermost vertical position, wherein the tilt angle of primary link 40a is at its greatest value. Where mechanism 10 is used in connection with the preferred environment shown in FIG. 1, a lower edge of viewing screen 22 is substantially at a height corresponding to the height of front shelf 12 when mechanism 10 is in its lowermost position.

By again viewing FIGS. 2a, 2b and 2c, it will be understood that monitor 20 undergoes tilting movement relative to upper end link 24c and thus upper linkage 24, as well as the support defined by the computer workstation, as an incident to vertical movement of the monitor relative to the workstation under the control of counterbalance mechanism 10. As may be appreciated from the above description, the present invention enables a user to position monitor 20 for optimal ergonomic accommodation. The monitor may be positioned vertically to a reading gaze position, wherein the line of sight is angled below the horizon by approximately 35 degrees, while maintaining the viewing screen substantially perpendicular to the line of sight. Also, a standing user may lower monitor 20 to a position wherein the monitor is at its greatest tilt angle, thereby permitting the user to view screen 22 from a vantage point higher than that normally experienced by a seated user. By enabling horizontally directed movement of the monitor in combination with the vertical and angular positioning features, a user may selectively position the monitor such that his or her eyes will be at a resting point of accommodation at which they will rest without using the eye muscles to hold them in focus. Further, the invention enables a user wearing bifocal eyeglasses to view the viewing screen 22 and keyboard 14 simultaneously through the small lens portion of his or her eyeglasses by suitably positioning monitor 20, thereby reducing neck movement.

While the above description relates to a preferred embodiment of the present invention, alternative embodiments are contemplated. Embodiments wherein an auxiliary linkage is associated with other types of counterbalance mechanisms for permitting vertical positioning of a load, for instance a mechanism having a single parallelogram linkage, and embodiments wherein an auxiliary linkage is associated with a lower distal end of the counterbalance mechanism for tilting the mechanism and a platform fixed to an upper distal end of the mechanism, are considered to be within the scope of the present invention, as defined by the claims appearing below.

What is claimed is:

1. A counterbalance mechanism for positioning a load relative to a support, said mechanism comprising:

a base for connecting said mechanism to said support;

a lower parallelogram linkage including a common connecting link, a lower end link connected to said base, and a pair of side links having opposite ends connected to said lower end link and said common connecting link by pivot pins;

an upper parallelogram linkage including said common connecting link, an upper end link, and a pair of side links having opposite ends connected to said upper end link and said common connecting link by pivot pins;

a pair of counterbalance spring means connected one to each of said lower and upper linkages; and an auxiliary linkage operatively connected to said upper linkage for carrying said load and automatically tilting said load relative to said upper linkage and said support incident to movement of said load relative to said support, whereby said load has a continuous variation in tilt relative to said base as said load moves vertically relative to said base.

2. A mechanism according to claim 1, wherein said auxiliary linkage comprises a primary link and a secondary link each having first and second opposite ends, said first end of said primary link being connected to said upper end link by a pivot pin, said second end of said primary link being connected to said first end of said secondary link by a pivot pin, and said second end of said secondary link being connected to one of said pair of side links of said upper linkage by a pivot pin.

3. A mechanism according to claim 2, further including means for mounting said load for movement with said primary link.

4. A mechanism according to claim 1, wherein said load is a monitor having a viewing screen, and said auxiliary linkage varies the tilt of said screen incident to vertically directed movement of said monitor through a range of vertical positions, such that said screen may be viewed from a reference position irrespective of the vertical position of said monitor within said range.

5. A mechanism according to claim 4, wherein said tilt of said monitor is varied continuously by said auxiliary linkage.

6. A mechanism according to claim 1, wherein said base includes trackway means connected to said support for enabling horizontally directed movement of said load.

7. A mechanism according to claim 6, wherein said trackway means comprises an elongated track plate adapted for attachment to said support and having a pair of parallel opposing guide channels extending along opposite sides thereof, and a guide plate fixedly connected to said lower end link, said guide plate having a pair of opposite side flanges arranged to be received within said guide channels for slidable motion therealong.

8. In a counterbalance mechanism for vertically positioning a load, said mechanism comprising a pair of parallelogram linkages having interconnected adjacent ends and distal ends and counterbalance means operably associated with said linkages for counterbalancing the weight of said load incident to vertical movement thereof, the improvement comprising:

an auxiliary linkage operatively connected to a distal end of one of said pair of linkages for carrying said load and automatically tilting said load relative to said distal end as a function of the vertical position of said load whereby said load has a continuous variation in tilt relative to said base as said load moves vertically relative to said base.

9. In the counterbalance mechanism according to claim 8, wherein a distal end of another of said pair of linkages is operatively connected to a trackway for supporting said mechanism and said load for horizontal reciprocating movement.

10. A mechanism for supporting a monitor on a support for viewing by a user as said monitor is moved relative to said support, said mechanism comprising in combination:

a counterbalance mechanism including a pair of parallelogram linkages having interconnected adjacent ends and distal ends;

means for attaching a distal end of one of said linkages to said support for arranging a distal end of the other of said linkages for vertical movement relative to said support; and an auxiliary linkage operatively connected to said distal end of said other of said linkages for carrying said monitor and automatically vertically tilting said monitor relative thereto and to said support incident to said vertical movement, said counterbalance mechanism tending to maintain said monitor in a vertical position above said support while permitting manually induced movements of said monitor vertically relative to said position.

11. A mechanism according to claim 10, wherein said means for attaching a distal end of one of said linkages to said support includes a trackway for supporting said distal end of one of said linkages on said support for horizontally directed movement.

12. A mechanism according to claim 10, wherein said auxiliary linkage includes primary link means having first and second ends, means for mounting said monitor on said primary link means, means for pivotally connecting said first end of said primary link means to said distal end of said other of said linkages, a secondary link means, means for pivotally connecting a first end of said secondary link means to said second end of said primary link means and means for pivotally connecting a second end of said secondary link means to a link of said other of said linkages which extends between said adjacent and distal ends thereof.

13. A mechanism according to claim 10, wherein said other of said linkages includes a pair of parallel links, an end link means pivotally connecting first ends of said parallel links and a connecting link means pivotally connecting second ends of said parallel links to each other and to said adjacent end of said one of said linkages, said auxiliary linkage includes primary link means having first and second ends, mounting means for mounting said monitor on said primary link means, pivot means for pivotally connecting said first end of said primary link means to said end link means remotely of the point of its pivotal connection to one of said pair of parallel links, secondary link means having first and second ends, and a pair of pivot means for pivotally connecting said first and second ends of said secondary link means to said second end of said primary link means and to said one of said pair of parallel links intermediate said ends thereof, respectively.

14. A mechanism according to claim 13, wherein said means for attaching a distal end of one of said linkages to said support includes a trackway for supporting said distal end of one of said linkages on said support for horizontally directed movement.

15. A mechanism for supporting a monitor at a workstation for vertical, horizontal, and vertical tilting movements under the control of a user, said mechanism comprising in combination:

a vertically disposed counterbalance mechanism having a lower end operably connected to a trackway for horizontally directed movement relative to said workstation and an upper end movable vertically relative to said lower end; and an auxiliary linkage operatively connected to said upper end for carrying said monitor and automatically vertically tilting said monitor relative to said workstation and said upper end incident to vertical movement of said upper end, said counterbalance mechanism tending to maintain said monitor in a vertical position above said lower end while permitting manually induced movements of said monitor vertically relative to said position throughout the ranges of vertical movement of said upper end and tilting movement of said monitor.

16. A mechanism according to claim 15, wherein said counterbalance mechanism includes a parallelogram linkage comprising a pair of parallel front and rear side links pivotally connected to an end link and cooperating to define said upper end; and said auxiliary linkage includes a primary link having first and second ends with said first end being connected to said end link remotely of the point of pivotal connection of said end link to said front side link, and a secondary link having first and second ends with pivot means connecting said first and second ends of said secondary link to said second end of said primary link and to said front side link remotely of the point of pivotal connection of said front side link to said end link.

17. In a counterbalance mechanism for vertically positioning a load relative to a support, said mechanism comprising parallelogram linkage means having opposite distal ends and counterbalance means operably associated with said parallelogram linkage means for counterbalancing the weight of said load incident to vertical movement thereof, the improvement comprising:

an auxiliary linkage operatively connected to one of said distal ends for automatically tilting said load relative to said support and said mechanism as a function of the vertical position of said load relative to said support, whereby said load has a continuous variation in tilt relative to said base as said load moves vertically relative to said base.

* * * * *